(12) United States Patent
Risch

(10) Patent No.: US 6,295,738 B1
(45) Date of Patent: Oct. 2, 2001

(54) CHAIN SAW MEASURING DEVICE

(76) Inventor: Joel V. Risch, 3275 Lucia Ave., Eureka, CA (US) 95503

( * ) Notice: Subject to any disclaimer, the term of this patent is extended or adjusted under 35 U.S.C. 154(b) by 0 days.

(21) Appl. No.: 08/638,903

(22) Filed: Apr. 24, 1996

(51) Int. Cl.[7] .................................................. B23Q 17/22
(52) U.S. Cl. .............................. 33/700; 33/263; 33/630; 33/DIG. 21
(58) Field of Search ........................... 33/228, 241, 262, 33/263, 275 R, 286, 574, 577, 628, 630, 700, DIG. 21

(56) References Cited

U.S. PATENT DOCUMENTS

| | | | |
|---|---|---|---|
| 2,765,007 | * 10/1956 | Hoffmann | 33/630 |
| 3,909,952 | * 10/1975 | Lagasse | 33/574 |
| 4,233,739 | * 11/1980 | Hinrichs | 33/630 |
| 4,319,404 | 3/1982 | Brock | 33/263 |
| 4,561,186 | 12/1985 | Keefe | 33/630 |
| 4,984,371 | 1/1991 | Fredrickson | 33/263 |
| 5,052,112 | * 10/1991 | MacDonald | 33/263 |
| 5,359,779 | * 11/1994 | Polk et al. | 33/DIG. 21 |
| 5,367,779 | * 11/1994 | Lee | 33/DIG. 21 |
| 5,437,104 | * 8/1995 | Chien | 33/DIG. 21 |
| 5,594,993 | * 1/1997 | Tager et al. | 33/DIG. 21 |

* cited by examiner

*Primary Examiner*—G. Bradley Bennett
(74) *Attorney, Agent, or Firm*—Townsend and Townsend and Crew LLP

(57) ABSTRACT

Chain saws and similar wood cutting equipment are equipped with a measuring device that permits accurate cutting of multiple pieces of equal length. The device is a non-expanding beam of focused light directed away from the saw at an angle relative to the cutting portion of the saw, and its use is achieved by positioning the saw at a location at which the light beam intersects the end of the length to be cut, the angle of the light beam determining the length.

13 Claims, 4 Drawing Sheets

CHAIN SAW MEASURING DEVICE

This invention resides in the field of chain saws and related wood-cutting equipment, and devices used in conjunction with such equipment for controlling the lengths of cut wood.

BACKGROUND OF THE INVENTION

The need to cut long lengths of wood such as planks or logs into shorter pieces of equal length arises for a variety of reasons, including forming pieces of uniform length for construction purposes and cutting logs for firewood. Equal lengths are often important, both for the efficient utilization of the available source wood and for reasons related to the use that the wood will serve after it is cut, whether it be for firewood or for construction.

For cutting logs in particular, a chain saw is fast and economical, but there is no simple, fast, easy and practical way of measuring the length to which the wood is to be cut. Currently used methods for cutting logs to a given length with a chain saw include: (1) measuring out the desired length with a tape measure and marking the length thus measured; and (2) using a stick precut to the desired length as a measuring device and marking the length of the stick on the log.

Further methods appear in the patent literature, but none are practical. For example, U.S. Pat. No. 4,319,404 (Helmut E. Brock, Mar. 16, 1982) discloses a sighting device for attachment to a chain saw, the device consisting of a length of hollow tubing containing a wire and a mirror with a line painted on the mirror. The device is a cumbersome object that requires careful adjustment and is easily knocked out of adjustment. In addition, the operator's line of sight must be perfectly aligned with a view port on the device to achieve the proper cutting length. Another example is U.S. Pat. No. 4,561,186 (Arthur N. Keefe, Dec. 31, 1985), which discloses a tape measure attached to the bar of a chain saw by a magnet with pegs extending through the chain saw bar. Use of this device requires the purchaser to drill holes into the chain saw bar to receive the pegs. The tape measure when thus attached must clear the log being cut. As a result, the operator can only cut logs that fit within the space between the saw motor and the location of the tape on the saw bar. This prevents the operator from using the full length of the saw. Still another example is that found in U.S. Pat. No. 4,984,371 (Robert N. Frederickson, Jan. 15, 1991), which uses mirrors to gauge the length of the piece to be cut. The accuracy of the device is dependent on the angles of the mirrors and the relative position of the operator. Like the Brock device, this device is easily misaligned when knocked or bumped, which are highly likely to occur to any device that is mounted on a chain saw. It is unlikely that anyone cutting firewood would exercise the care required to operate this device successfully.

SUMMARY OF THE INVENTION

These and other difficulties with current (or published) methods and devices for use with chain saws to measure out lengths of wood to be cut are addressed by the present invention. According to this invention, a light source emitting a substantially non-expanding beam of light is secured to the stationary portion of the chain saw, directing the light at an angle relative to the chain saw. While the log (or other length of wood) is advancing into cutting position or the chain saw is being moved along the log, the operator need only watch the log to note when the light beam first becomes visible on the surface of the log (or reaches the end of the log from any direction). At this point the chain saw will be in position to cut the desired length. A selected cutting length is thus achieved by appropriate placement of the light source on a stationary portion of the saw and adjustment of the angle of the beam emitted from the source.

While chain saws are of particular interest, the light source can be used on any type of power-driven saw. As a measuring device, the light source is small, easy to mount in a manner at a fixed angle that is not readily knocked out of position, and useful on any size and type of power-driven saw. The device does limit the use of the saw to logs of a particular diameter, and the operator is not required to achieve eye alignment with the device to operate it successfully.

These and other features and advantages of the invention will become apparent from the description that follows.

DETAILED DESCRIPTION OF THE INVENTION AND PREFERRED EMBODIMENTS

This invention is susceptible to a wide range of components, constructions and methods of use. For a thorough understanding, however, reference is made to the attached drawings illustrating specific examples of chain saws that embody the concepts of this invention in different ways.

Figure 1:
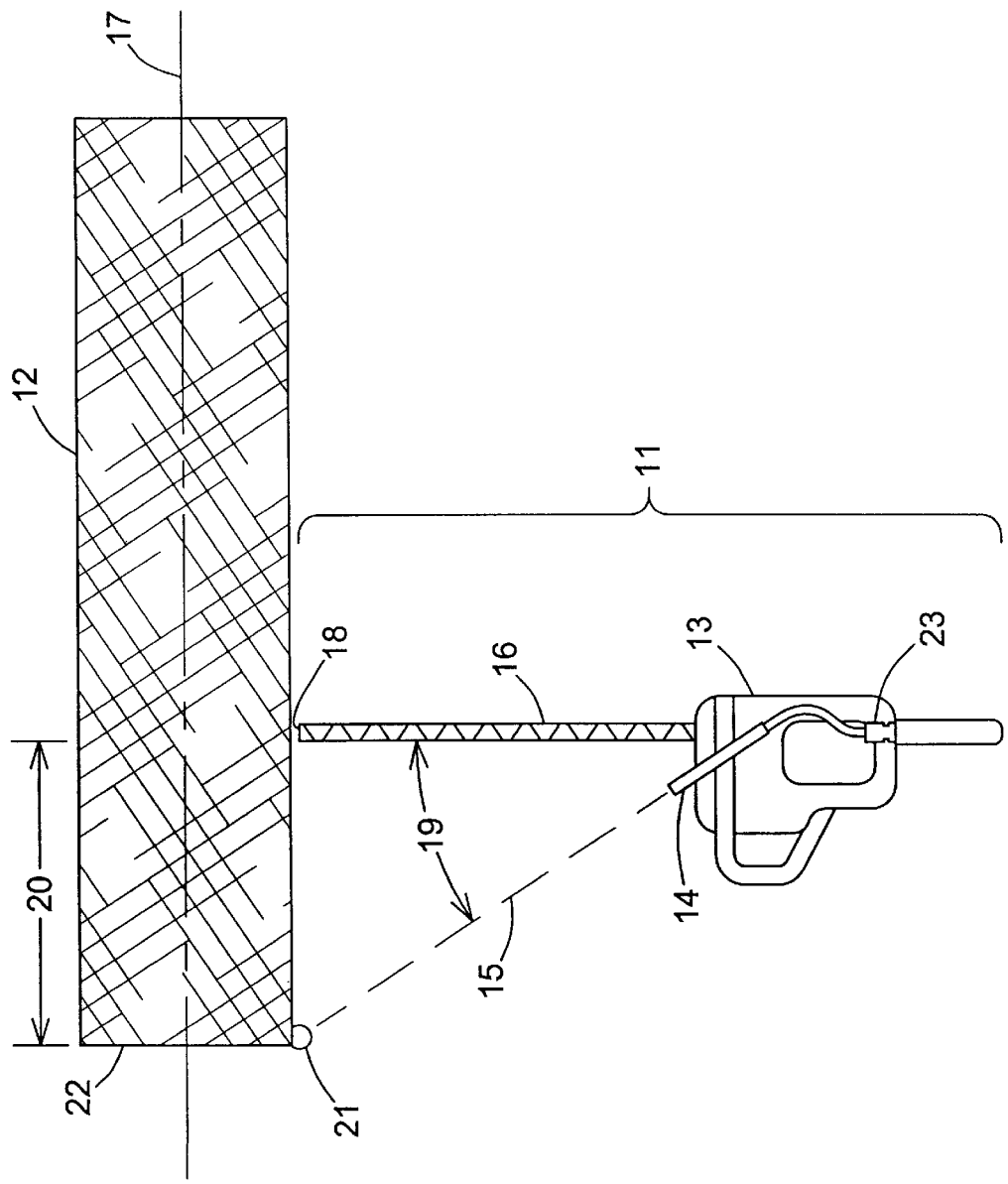
FIG. 1 is a view of a chain saw bearing a length measuring device in accordance with this invention, together with a log from which a piece is to be cut, both viewed from above.

FIG. 1 depicts a chain saw 11 in accordance with this invention, in position to cut a piece of preselected length off a log 12. Mounted to the motor housing 13 of the chain saw is a laser diode 14, which represents one example of a light source that can emit an intense, non-expanding narrow-diameter beam of light 15. An incandescent bulb with an appropriate reflector and lens can be used in place of the laser diode, although a laser is preferred. With power to the saw turned off, the cutting chain 16 is positioned perpendicular to the axis 17 of the log 12, with the extremity 18 of the cutting chain either touching the log surface or close enough that the difference is negligible relative to the length of the chain. The angle 19 of the laser beam 15 is fixed by the manner in which the diode 14 is attached to the motor housing. The laser beam 15 thus forms the hypotenuse of a right triangle with the log surface and the chain, and the angle 19 establishes the length of the leg 20 of this triangle that runs along the log surface, which length is the desired length of the piece to be cut.

The laser beam 15 shines a dot of light 21 on the log surface, and when this dot of light is at the edge 22 of the log, the cutting chain 16 is at the appropriate position to cut the log to achieve a piece of the desired length. A manually operated switch 23 mounted to the chain saw motor housing 13 turns the laser on and off. Once the saw is positioned, of course, it is advanced toward the log in the direction perpendicular to the log axis to fully traverse the log 12, and turned on. Once cutting is completed, either the log 12 is moved to the left (when in the position shown in the drawing) or the chain saw 11 is moved to the right until the small circle of light 12 is at the freshly cut edge. The cutting chain 16 is then in position to cut a second piece of the same length as the first.

Figure 2:
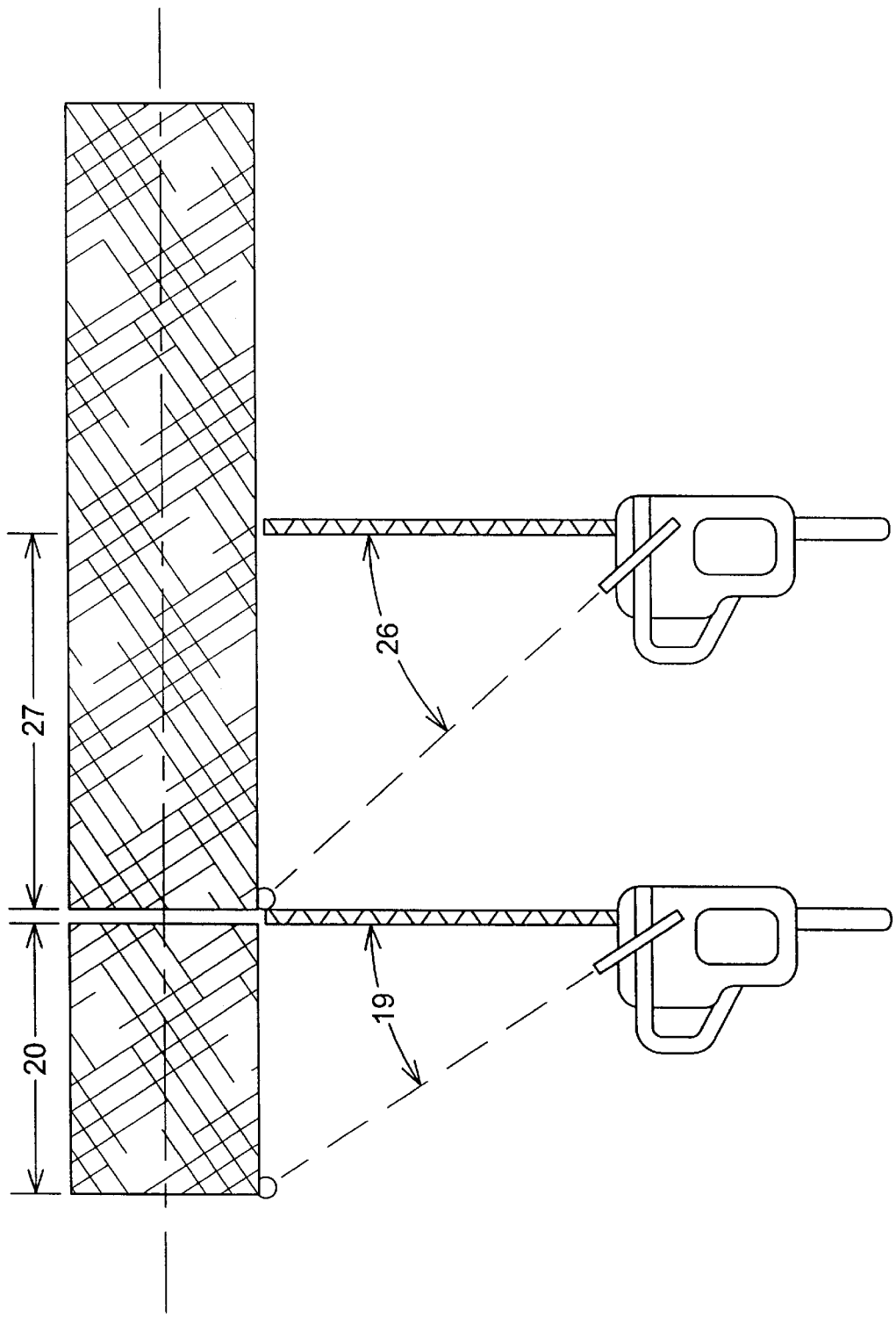
FIG. 2 is a view of the chain saw and log of FIG. 1 from the same perspective, with the device being adjusted to enable the saw to be used for cutting pieces of two different lengths.

As shown in FIG. 2, adjustment of the angle 19 of the laser beam to a wider angle 26 will result in a cut piece of a greater length 27. The angle can be adjusted before any cutting is begun, or it can be adjusted or changed in between cuts. Incremental angles can be marked on the motor housing and expressed either as the length of the piece that will be cut or as an angle, in which case a scale showing the correspondence between the angle and the cut piece length will be placed elsewhere on the motor housing or handle.

Figure 3:
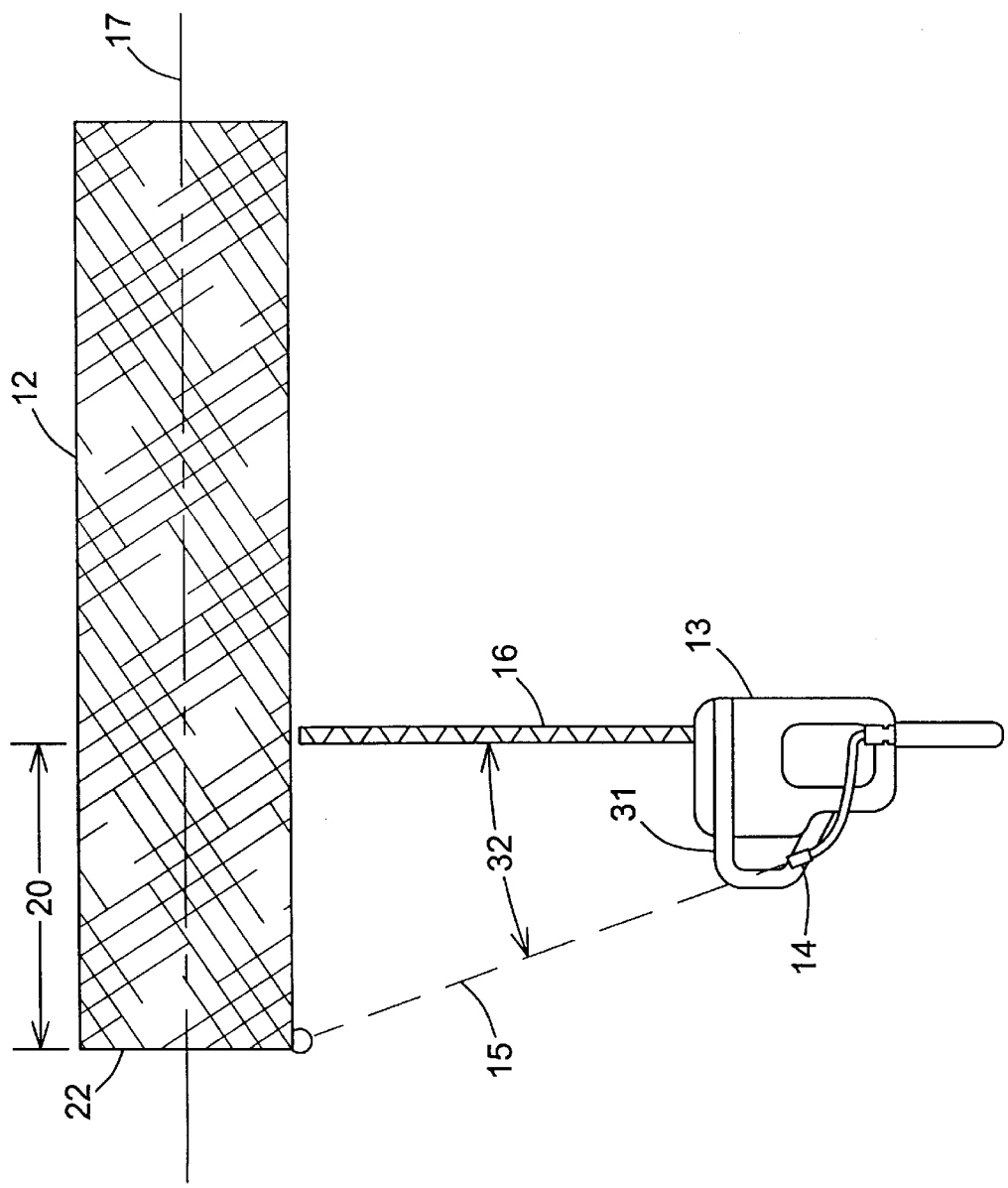
FIG. 3 is a similar view of a chain saw in accordance with this invention, differing from that of FIGS. 1 and 2 by the location at which the measuring device is mounted.

As an alternative to mounting the laser diode 14 to the motor housing 13, the laser diode can be mounted to the handle 31, as shown in FIG. 3. In most chain saws, particularly those intended for right-handed use, this will result in the diode 14 being closer to the freshly cut edge 22 of the log, achieving the same length of cut wood with a smaller angle 32. An advantage of the use of a smaller angle is that less error results when the chain 16 deviates slightly from a 90° angle relative to the log axis 17.

Figure 4:
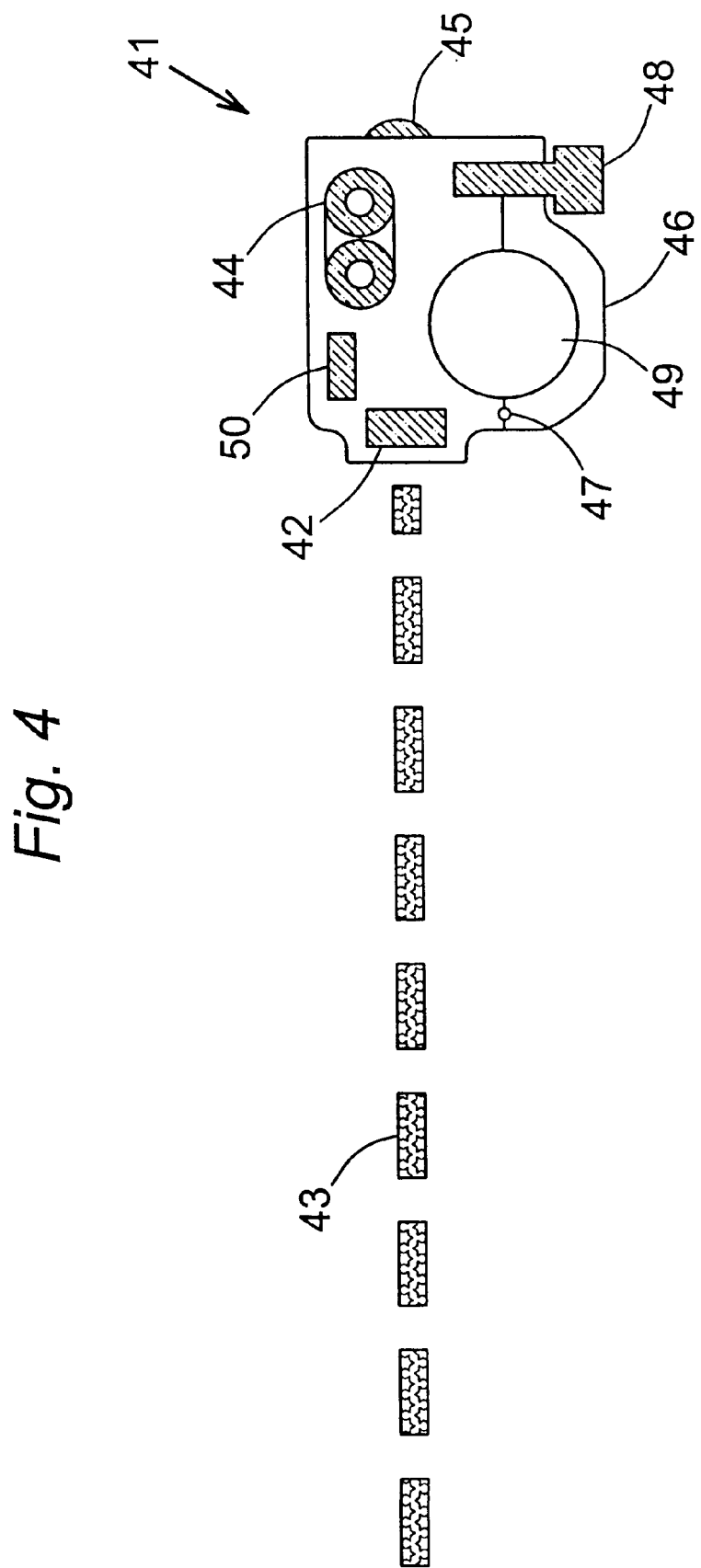
FIG. 4 is a cross section view of a measuring device in accordance with this invention, suitable for attachment to the handle of a chain saw.

FIG. 4 depicts one example of a unit 41 for attachment to a chain saw handle, the unit incorporating a laser diode 42 emitting a laser beam 43, batteries 44, a finger-operated push-button switch 45, and a securement member 46 which clasps the unit around the handle of a chain saw. The securement member 46 is attached to the rest of the unit by a hinge 47 and tightened down by a tightening knob 48. Each of these parts can be substituted by any conventional means, all readily apparent to those skilled in mechanics and hand tool construction, for clasping the unit onto the chain saw motor body or handle in a secure yet removable manner. In the unit shown in FIG. 4, the handle of the chain saw (not shown) passes through the opening 49 between the securement member and the remainder of the unit. The unit optionally contains a timer 50 that automatically turns the switch off after a preselected period of time. The angle of the laser beam 43 can be adjusted or selected in various ways. If the portion of the chain saw handle that the unit is clamped onto (and that passes through the opening 49) is vertical when the saw is in the cutting position, the angle can be adjusted by rotating the unit around the handle to the desired angle before tightening the tightening knob 48. Alternatively, the unit can be secured to a curved portion of the handle at a location on the curve that will result in the desired orientation of the beam. Other possibilities will be readily apparent to those familiar with chain saws and their construction.

An optional feature of the laser circuitry, which may be included for additional ease of use if desired, is a switch that is governed by the position of the chain saw. A switch of this kind can be one that energizes the diode when rotated to a certain position and deenergizes the diode when rotated back to its original position. A mercury switch is one example of a switch of this type; others will be readily apparent to those having a routine knowledge of electric switches. One example of the use of a switch of this kind is one which is turned on or off by rotation of the chain saw about an axis parallel to the chain saw bar, i.e., by rotating the bar itself between a horizontal position (such as for cutting a standing tree) and a vertical position (such as for cutting a horizontally arranged log). The switch in this example will be positioned so that the diode will remain deenergized when the bar is either vertical or horizontal and the handle is either beside or above the bar (the latter being the normal position for felling a tree). The switch will then be energized when the bar is rotated back through the vertical position toward the horizontal with the handle below rather than above the bar, to an angle of rotation within the range of 45–90° from the vertical. The angle of the laser beam will then be selected such that the beam will intersect the log when the chain saw is at this 45–90° angle.

The foregoing is offered primarily for purposes of illustration. It will be readily apparent to those skilled in the art that the components, their arrangements relative to one another, and their methods of use as described herein may be further modified or substituted in various ways without departing from the spirit and scope of the invention. for example, the angle-adjustable light source can be utilized both on hand-held cutting devices such as chain saws, and on larger, floor- or table-mounted cutting machines.

I claim:

1. A saw for cutting logs to preselected lengths, comprising:

power-driven cutting means operable for cutting a log in a cutting plane;

support means to which said cutting means are mounted; and a light source secured to said support means, for emitting a substantially non-expanding light beam at a preselected angle relative to said cutting means.

2. A saw in accordance with claim 1 in which said light source is secured to said support means in a rotatably adjustable manner, permitting adjustment of said preselected angle within a range of 0° to 90°.

3. A saw in accordance with claim 1 in which said light source is mounted to said support means at a location approximately within said cutting plane.

4. A saw in accordance with claim 1 in which said light source is mounted to said support means at a location displaced from said cutting plane.

5. A saw in accordance with claim 1 further comprising a hand-operated switch mounted to said support means for actuating said light source.

6. A saw in accordance with claim 1 in which said preselected angle is transverse to said cutting plane.

7. A saw in accordance with claim 1 further comprising a hand-actuated, timer-controlled switch mounted to said support means for actuating said laser source, said switch turning said light source off automatically after a preselected period of time.

8. A saw in accordance with claim 1 in which said light source is a laser diode.

9. A saw in accordance with claim 1 in which said cutting means is a cutting chain.

10. A measuring device for mounting to a chain saw to cut logs to preselected lengths, said device comprising:

a light source adapted to emit a substantially non-expanding light beam; and means for affixing said light source to a chain saw such that said light beam is emitted at a preselected angle relative thereto.

11. A measuring device in accordance with claim 10 in which said affixing means is adjustable to vary said preselected angle.

12. A measuring device in accordance with claim 10 in which said light source is a laser diode.

13. A measuring device in accordance with claim 10 further comprising a hand-actuated, timer-controlled switch for actuating said light source, said switch turning said light source off automatically after a preselected period of time.

* * * * *